United States Patent
Kitazoe (10) Patent No.: US 9,118,529 B2
(45) Date of Patent: Aug. 25, 2015

(54) DISCOVERY OF NEIGHBOR CELLS

(75) Inventor: Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1144 days.

(21) Appl. No.: 11/686,837

(22) Filed: Mar. 15, 2007

(65) Prior Publication Data

US 2007/0291770 A1    Dec. 20, 2007

Related U.S. Application Data (60) Provisional application No. 60/815,290, filed on Jun. 20, 2006.

(51) Int. Cl.

| | | |
|---|---|---|
| H04L 12/28 | (2006.01) | |
| H04W 4/00 | (2009.01) | |
| H04L 29/12 | (2006.01) | |
| H04J 11/00 | (2006.01) | |
| H04W 8/00 | (2009.01) | |
| H04W 8/26 | (2009.01) | |
| H04W 80/04 | (2009.01) | |
| H04W 88/08 | (2009.01) | |

(52) U.S. Cl.
CPC ....... *H04L 29/12113* (2013.01); *H04J 11/0093* (2013.01); *H04L 61/1541* (2013.01); *H04W 8/005* (2013.01); *H04W 8/26* (2013.01); *H04W 80/04* (2013.01); *H04W 88/08* (2013.01)

(58) Field of Classification Search
CPC . H04W 24/10; H04W 8/005; H04W 36/0016; H04W 36/0022; H04W 36/0055; H04W 36/0061; H04W 36/0088
See application file for complete search history.

(56) References Cited

U.S. PATENT DOCUMENTS

| | | | |
|---|---|---|---|
| 6,259,683 B1 * | 7/2001 | Sekine et al. | 370/328 |
| 6,289,220 B1 * | 9/2001 | Spear | 455/436 |
| 6,760,588 B2 * | 7/2004 | Okajima et al. | 455/437 |
| 6,904,025 B1 * | 6/2005 | Madour et al. | 370/328 |
| 6,965,584 B2 * | 11/2005 | Agrawal et al. | 370/331 |
| 7,193,991 B2 * | 3/2007 | Melpignano et al. | 370/352 |
| 7,263,357 B2 * | 8/2007 | Lee et al. | 455/432.1 |
| 7,272,123 B2 * | 9/2007 | Wall | 370/331 |

(Continued)

FOREIGN PATENT DOCUMENTS

| | | |
|---|---|---|
| EP | 1011241 A1 | 6/2000 |
| EP | 1703681 | 9/2006 |

(Continued)

OTHER PUBLICATIONS

U.S. Appl. No. 60/779,739, filed Mar. 7, 2006, Shaheen, "Method and System for Handover in a Long Term Evolution Active Mode".*

(Continued)

*Primary Examiner* — Gregory Sefcheck
(74) *Attorney, Agent, or Firm* — Kristine U. Ekwueme (57) ABSTRACT

The present patent application comprises a method and apparatus to identify an address of a neighboring node, comprising the steps of identifying an existence of a neighboring cell, receiving a measurement report containing an identifier of the cell; sending an inquiry containing the identifier of the cell to a server, wherein the inquiry inquires what the IP address of the neighboring node of the cell is, and receiving an inquiry response containing the IP address of the neighboring node. In another embodiment, the inquiry containing the identifier of the cell is sent to other nodes.

38 Claims, 10 Drawing Sheets

(56) References Cited

U.S. PATENT DOCUMENTS

| | | | |
|---|---|---|---|
| 7,376,101 B2 | 5/2008 | Shim et al. | |
| 7,421,268 B2* | 9/2008 | Lee et al. | 455/411 |
| 7,477,920 B2* | 1/2009 | Scheinert et al. | 455/561 |
| 7,545,754 B2* | 6/2009 | Funato et al. | 370/254 |
| 7,606,206 B2* | 10/2009 | Yi et al. | 370/335 |
| 7,768,982 B2* | 8/2010 | Zhang et al. | 370/338 |
| 7,822,810 B2* | 10/2010 | Dayal et al. | 709/204 |
| 7,885,651 B2* | 2/2011 | Akihara | 455/423 |
| 7,929,948 B2* | 4/2011 | Lee et al. | 455/411 |
| 8,170,010 B2* | 5/2012 | Bachmann et al. | 370/389 |
| 8,374,122 B2* | 2/2013 | Meier et al. | 370/328 |
| 2002/0034166 A1* | 3/2002 | Barany et al. | 370/329 |
| 2002/0118656 A1* | 8/2002 | Agrawal et al. | 370/329 |
| 2003/0087646 A1* | 5/2003 | Funato et al. | 455/456 |
| 2003/0179731 A1 | 9/2003 | Noguchi et al. | |
| 2004/0054723 A1* | 3/2004 | Dayal et al. | 709/204 |
| 2005/0117542 A1* | 6/2005 | Madour | 370/329 |
| 2006/0003771 A1 | 1/2006 | Heino et al. | |
| 2006/0092888 A1* | 5/2006 | Jeong et al. | 370/338 |
| 2006/0234713 A1 | 10/2006 | Oswal et al. | |
| 2007/0070963 A1 | 3/2007 | Li et al. | |
| 2007/0213060 A1* | 9/2007 | Shaheen | 455/436 |
| 2007/0225001 A1* | 9/2007 | Heino et al. | 455/446 |
| 2007/0225023 A1* | 9/2007 | Abusch-Magder | 455/515 |
| 2007/0225029 A1* | 9/2007 | Abusch-Magder | 455/525 |
| 2007/0254656 A1* | 11/2007 | Dalsgaard | 455/435.1 |
| 2008/0101356 A1* | 5/2008 | Babbar et al. | 370/389 |
| 2008/0159221 A1* | 7/2008 | Hirano et al. | 370/331 |
| 2009/0279507 A1* | 11/2009 | Kanazawa et al. | 370/332 |
| 2011/0256891 A1* | 10/2011 | Soliman et al. | 455/458 |

FOREIGN PATENT DOCUMENTS

| | | |
|---|---|---|
| RU | 2002119224 | 1/2004 |
| WO | 2005067229 | 7/2005 |

OTHER PUBLICATIONS

U.S. Appl. No. 60/792,935, filed Apr. 18, 2006, Shaheen, "Method and Apparatus for Supporting Handoff in a Long Term Evolution GPRS Tunneling Protocol-Based System".*
International Search Report—PCT/US07/071252. International Search Authority—European Patent Office—Jan. 15, 2008.
Shin M. et al: "Improving the latency of 802.11 hand-offs using neighbor graphs" Proceedings of the 2nd International Conference on Mobile Systems, Applications, and Services, Jun. 6, 2004-Jun. 9, 2004 pp. 70-83. XP002463430.
Taiwanese Search report—096122105—TIPO—Dec. 25, 2010.
Written Opinion—PCT/US07/071252, International Search Authority—European Patent Office—Jan. 15, 2008.
TIA: "Forward Link Only Air Interface Spcification Rev. 1.1" Internet Citation Dec. 22, 2005 , XP002387062, Retrieved from the Internet: URL:http://ftp.tiaonline.org/TR-47/TR471/Working/20060110-Arlington-meeting1/TR471-20060110-004a__FLO%20AIS.pdf> [retrieved on Jun. 26, 2006].

* cited by examiner

DISCOVERY OF NEIGHBOR CELLS

CLAIM OF PRIORITY UNDER 35 U.S.C. §119

This application claims benefit of U.S. Provisional Application titled "Discovery of Neighbor Cells in E-UTRAN," filed Jun. 20, 2006 and assigned provisional patent application No. 60/815,290, the entire disclosure of this application being considered part of the disclosure of this application.

BACKGROUND

1. Field

The present application pertains generally to communications, and more specifically, to discovery of neighbor cells in E-UTRAN.

2. Background

In the $3^{rd}$ Generation Partnership Project (3GPP) Long Term Evolution (LTE), network nodes have a logical connection to each other over an IP transport. In the decentralized architecture, Node B may be considered to be attached to the network in a "plug-n-play" manner, wherein Node B self-configures operation parameters. It is expected that Node B will use information provided by user equipment (UE). Then the Node B may establish an association with the neighbor cells. However, in the prior art, the UEs do not know the IP addresses of those neighboring cells, the UEs just provide a cell ID.

Universal Mobile Telecommunications System (UMTS) is one of the third-generation (3G) mobile telephone technologies (or 3rd Generation Wireless Mobile Communication Technology). A UMTS network consist of 1) a core network (CN), 2) a UMTS terrestrial radio access network (UTRAN) and 3) user equipment (UE). The core network work provides routing, switching, and transit for user traffic. A Global System for Mobile Communications (GSM) network with General Packet Radio Service (GPRS) is the basic core network architecture that UMTS is based on. The UTRAN provides the air interface access method for User Equipment. A base station is referred as Node B and control equipment for Node Bs is called a radio network controller (RNC). For an air interface, UMTS most commonly uses a wideband spread-spectrum mobile air interface known as wideband code division multiple access (or W-CDMA). W-CDMA uses a direct sequence code division multiple access signaling method (or CDMA) to separate users.

A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3G communications network which can carry both real-time circuit switched and IP based packet switched traffic types. The RNC provides control functionalities for one or more Node Bs. Connectivity is provided between the UE (user equipment) and the core network by the UTRAN.

Figure 1:
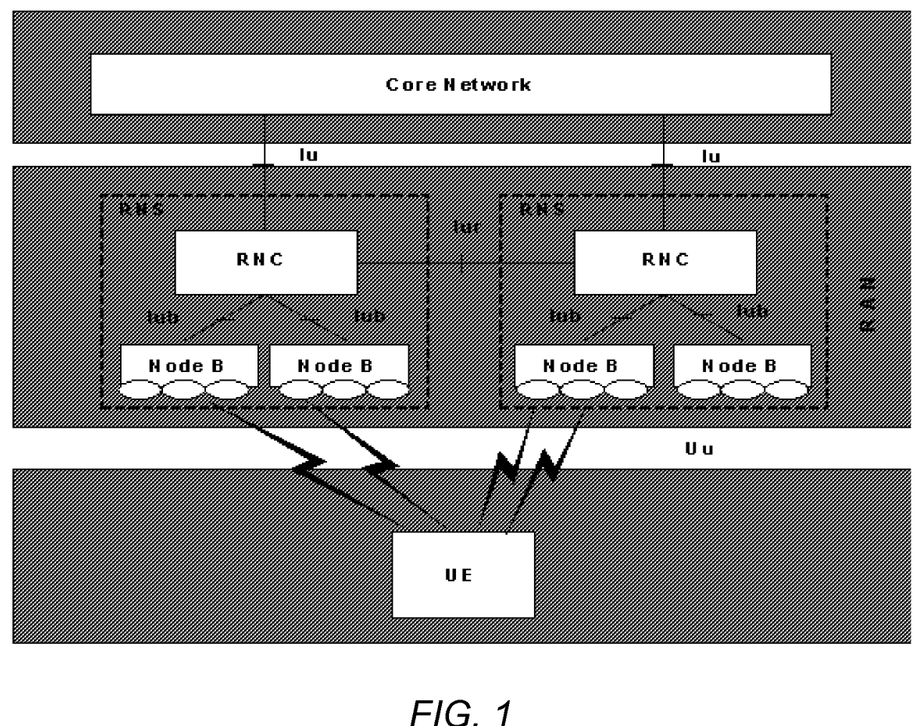
FIG. 1 is a block diagram of a radio access system having two radio network subsystems along with its interfaces to the core and the user equipment.

The UTRAN is connected internally or externally to other functional entities by four interfaces: Iu, Uu, Iub and Iur. The UTRAN is attached to a GSM core network via an external interface called Iu. A radio network controller (RNC) supports this interface. In addition, RNC manages a set of base stations called Node Bs through interfaces labeled Iub. The Iur interface connects two RNCs with each other. The UTRAN is largely autonomous from the core network since the RNCs are interconnected by the Iur interface. FIG. 1 discloses a communication system which uses the RNC, the Node Bs and the Iu and Uu interfaces. The Uu is also external, connects the Node B with the UE, while the Iub is an internal interface connecting the RNC with the Node B.

The RNC fills multiple roles. First, it may control the admission of new mobiles or services attempting to use the Node B. Second, from the Node B, i.e. base station, point of view, the RNC is a controlling RNC. Controlling admission ensures that mobiles are allocated radio resources (bandwidth and signal/noise ratio) up to what the network has available. It is where Node B's Iub interface terminates. From the UE, i.e. mobile, point of view, the RNC acts as a serving RNC in which it terminates the mobile's link layer communications. From the core network point of view, the serving RNC terminates the Iu for the UE. The serving RNC also controls the admission of new mobiles or services attempting to use the core network over its Iu interface.

Figure 2:
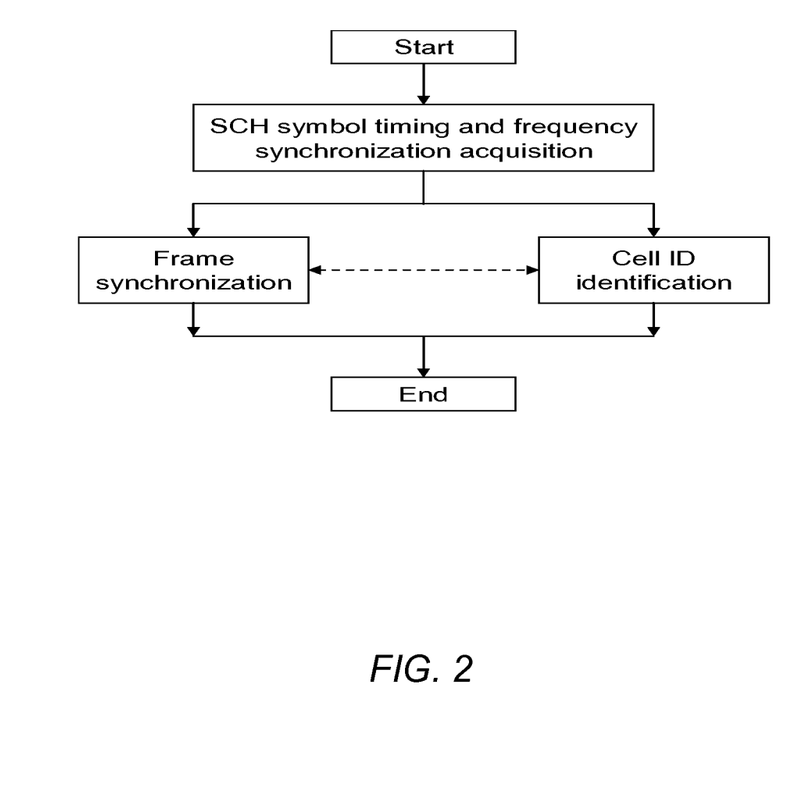
FIG. 2 is a flowchart disclosing the basic cell search procedure.

Cell searching is the procedure by which a UE acquires time and frequency synchronization with a cell and detects the cell ID of that cell. Two signals ("channels") transmitted in the downlink, the "SCH" (Synchronization Channel) and "BCH" (Broadcast Channel) may be used in a universal terrestrial radio access (or UTRA) cell search. In the UMTS system, UTRA identifies the time division duplex (TDD) and the frequency division duplex (FDD) access mode. The primary purpose of the SCH is to acquire the timing, i.e., at least the SCH symbol timing, and frequency of the received downlink signal. The BCH broadcasts a set of cell and/or system-specific information which may be similar to the current UTRA BCH transport channel. Aside from the SCH symbol timing and frequency information, the UE acquires cell-specific information such as the cell ID. To facilitate cell ID detection, the cell ID may be embedded into the SCH. For example, the cell ID may be directly mapped into the SCH, or different cell ID information may be group-wised. For the case of group ID, cell ID group index can be detected using the SCH, and the cell IDs within the detected cell ID group can be detected using reference symbols or the BCH. As an alternative approach, information regarding the BCH bandwidth and CP length may be detected by blind detection from the SCH or BCH, by using hypothesis testing for example. FIG. 2 is a flowchart disclosing the basic cell search procedure.

SUMMARY OF THE INVENTION

In view of the above, the described features of the present invention generally relate to one or more improved systems, methods and/or apparatuses for data communications. In one embodiment, the present patent application comprises a method and apparatus to identify an address of a neighboring node, comprising the steps of identifying an existence of a neighboring cell, receiving a measurement report containing the identifier of the cell; sending an inquiry containing the identifier of the cell to a server, wherein the inquiry inquires what the IP address of the neighboring node of the cell is, receiving an inquiry response containing the IP address of the neighboring node, sending a connection establishment message to the neighboring node, and establishing an association with the neighboring node.

In another embodiment, the present patent application comprises a method and apparatus to identify an address of a neighboring node, comprising the steps of identifying an existence of a neighboring cell, receiving a measurement report containing the identifier of the cell, sending an inquiry containing the identifier of the cell to other nodes, wherein the inquiry inquires what the IP address of the neighboring node of the cell is, receiving an inquiry response containing the IP address of the neighboring node, sending a connection establishment message to the neighboring node, and establishing an association with the neighboring node.

Further scope of the applicability of the present method and apparatus will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Figure 3:
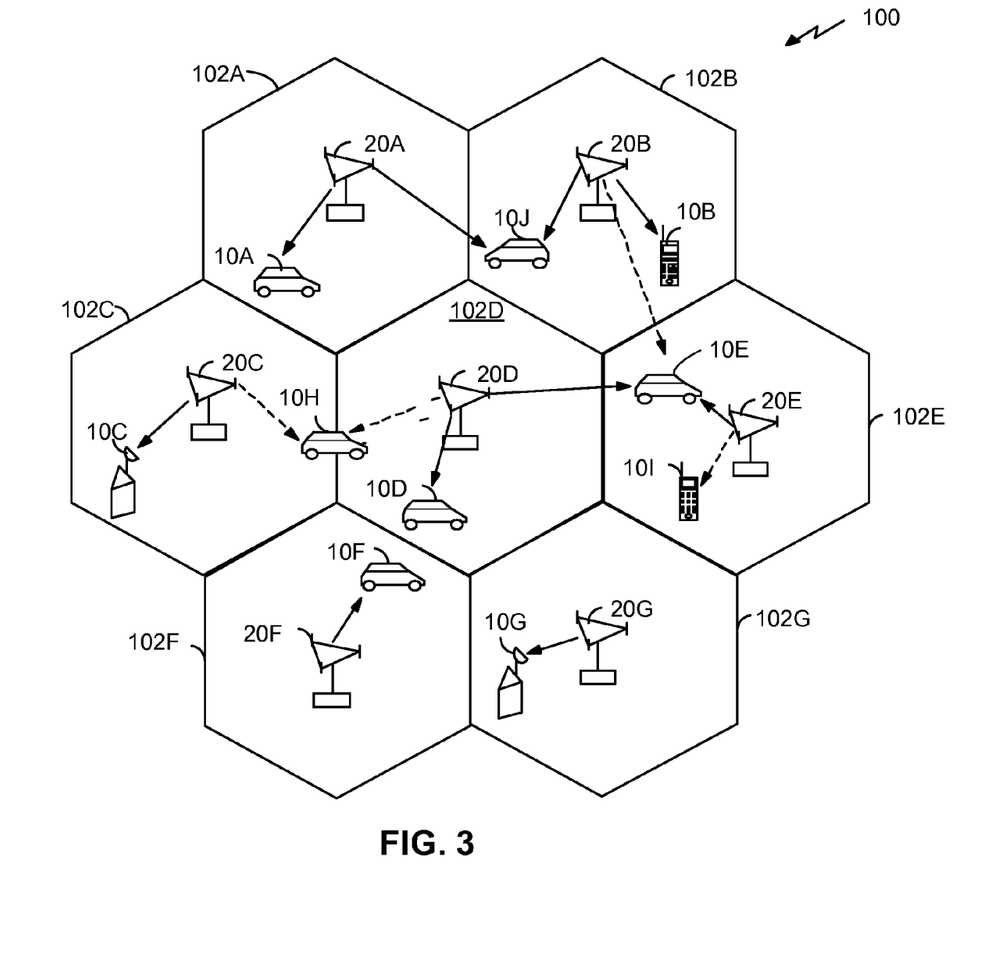
FIG. 3 is a diagram of a cellular communication system.

Communication systems may use a single carrier frequency or multiple carrier frequencies. Each link may incorporate a different number of carrier frequencies. Furthermore, an access terminal 10 may be any data device that communicates through a wireless channel or through a wired channel, for example using fiber optic or coaxial cables. An access terminal 10 may be any of a number of types of devices including but not limited to PC card, compact flash, external or internal modem, or wireless or wireline phone. The access terminal 10 is also known as user equipment (UE), a remote station, a mobile station or a subscriber station. Also, the UE 10 may be mobile or stationary. An example of a cellular communication system 100 is shown in FIG. 3 where reference numerals 102A to 102G refer to cells, reference numerals 20A to 20G refer to Node Bs or evolved Node Bs (eNode Bs) or base stations and reference numerals 10A to 10G refer to UEs.

Figure 4:
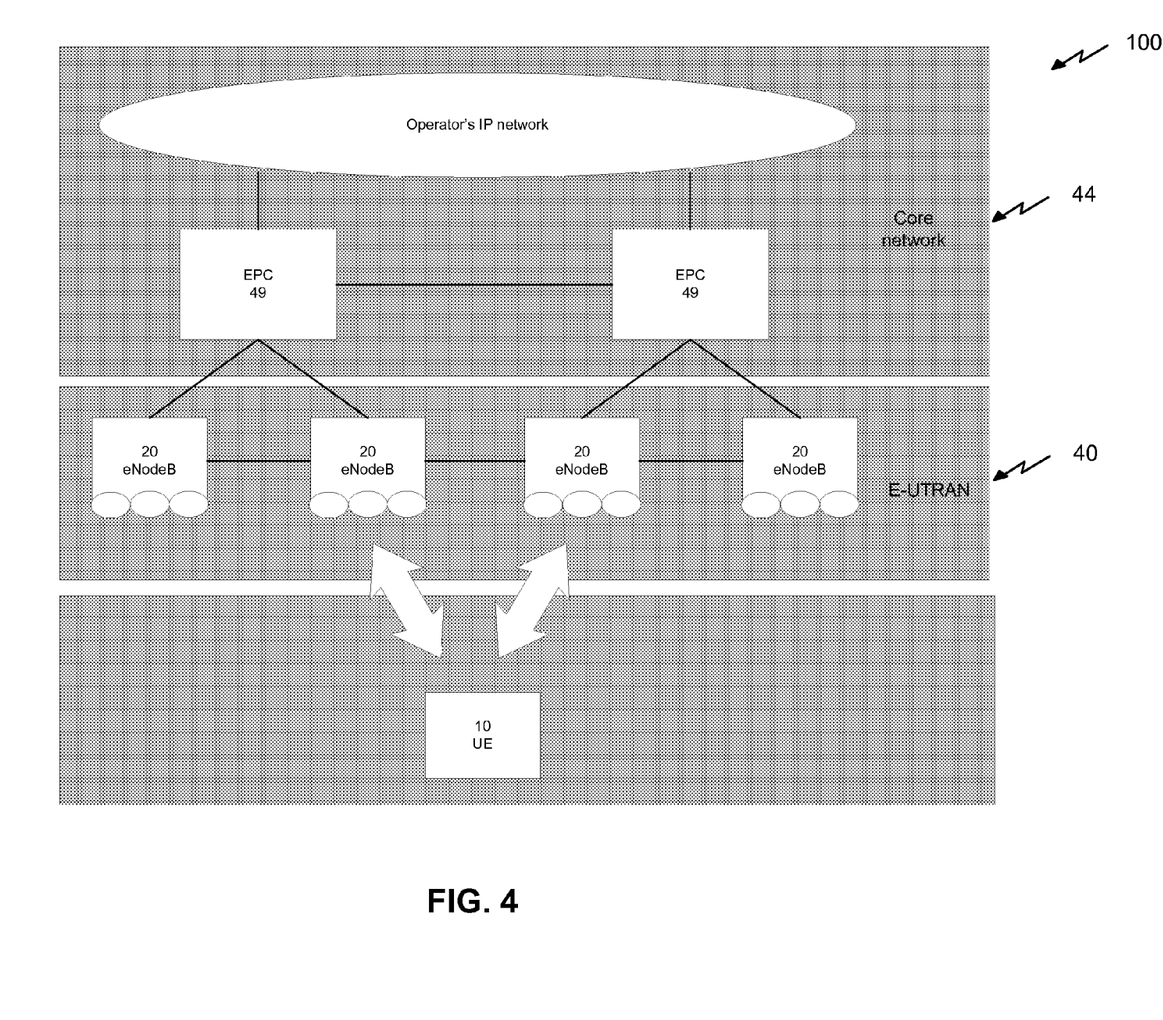
FIG. 4 is a block diagram of a communication system 100 having a 3GPP LTE/SAE architecture which uses an evolved UTRAN.

FIG. 4 is a block diagram of a communication system 100 having a 3GPP LTE/SAE architecture which uses an evolved UTRAN (E-UTRAN). User equipment 10 may communicate with one or more eNode Bs 20 by transmitting and receiving data packets through one or more eNodeBs 20. Unlike the UTRAN discussed above, there is no radio network controller 65 (also referred to as a base station controller (BSC) 65 or modem pool controller (MPC) 65). Instead, all radio-related functions are in the eNode Bs 20. Another difference is found in the core network 44 which is comprised of an IP network operably connected to one or more evolved packet cores (EPC) 49. As shown in FIG. 4, the evolved packet cores 49 may be connected to each other and to individual or many eNode Bs 20. These multiple connections minimize single points of failure above the eNode Bs 20. Also, the eNode Bs 20 may be connected to each other.

An access network 40 transports data packets between multiple access terminals 10 or user equipment 10. The access network 40 may be further connected to additional networks outside the access network 40, such as a corporate intranet or the Internet, and may transport data packets between each user equipment 10 and such outside networks 122. User equipment 10 that has established an active traffic channel connection with one or more eNode Bs 20 is called active user equipment 10, and is said to be in a traffic state. User equipment 10 that is in the process of establishing an active traffic channel connection with one or more eNode Bs 20 is said to be in a connection setup state. User equipment 10 may be any data device that communicates through a wireless channel or through a wired channel, for example using fiber optic or coaxial cables. The communication link through which the user equipment 10 sends signals to the eNode B 20 is called a reverse link. The communication link through which an eNodeB 20 sends signals to a user equipment 10 is called a forward link.

A goal with current E-UTRAN systems is to minimize operational efforts for E-UTRAN system setup. To deploy LTE quickly and in a cost effective manner, the LTE/SAE system supports automatic installation and setup of newly deployed nodes 20 (eNode Bs) in a plug-and-play manner. Plug and play (PnP) is a computer feature that allows the addition of a new device, such as a peripheral, without reconfiguring the system or manually installing the device drivers. There seem to be two elements in the concept of "plug-and-play" eNode B 20: 1) Discovery of other nodes and session establishment to discovered nodes 20; and 2) Self-configuration of operational parameters by an eNode B 20. Self-configuration includes the configuration of a neighbor list 45 maintained by an eNode B 20. The neighbor list 45 may be constructed over time through radio measurements performed by UEs 10 on the E-UTRAN. Self-configuration of the neighbor list 45 in LTE network where the concept of the plug-n-play eNode B 20 is used might be based on a number of methods such as measuring RF on the E-UTRAN, and potentially other supported radio access technologies (RATs), and querying neighbor cell 102 related information via the backbone from the system or via neighbor eNode Bs 20, etc.

To hand over control of user equipment 10 from a source (or serving) eNode B 20 to a target eNode B 20, the source eNode B 20 uses a connection/association with the target eNode B 20. A measurement report may be used to assist in the handover. (The term handoff (or handover) involves transferring an ongoing call or data session from one node 20 connected to the core network 44 to another node 20. The nodes 20 may be in different cells 102, different sectors of the same cell 102, or sometimes within the same cell 102. A handover may occur if user equipment 10 receives a stronger signal (e.g., better metric performance such as signal-to-noise ratio) from another node 20. Another reason for a handover is if a current node 20 is full.) The UE 10 continuously monitors neighboring cells 102 to determine which may become a candidate cell 102 for handover. The UE 10 then generates a measurement report using a cell ID which identifies a candidate cell 102 for handover and sends the measurement report to the source eNode B 20 which is currently serving the UE 10. Put another way, the source eNode B 20 is currently serving the cell 102 in which the UE 10 is located. (The cell ID may represent the candidate cell's 102 geographical location). One problem in the prior art is that the serving (or source) eNode B 20 may not know the Internet Protocol (IP) address of the neighboring or target eNode B 20 of the candidate cell 102 identified in the measurement report. It is desirable for a source eNode B 20 to know the contact point (IP address) of the neighboring or target eNode B 20 of the cell 102 identified by a cell ID reported by the UE 10. The present patent application addresses this issue. The following is a disclosure of the methods and apparatuses to solve this problem and obtain the IP address of the target eNode B 20.

In the LTE where IP transport is used among the eNode Bs 20 in the core network 44 and the RAN 40, multicast IP transport and unicast IP transport are available for nodes 20 to communicate with each other. IP multicast is used by a network node 20 to send a message to all the nodes 20 participating in a multicast group IP address. Unicast is used when a network node 20 wants to talk to a particular node 20 for which a unicast IP address is known.

Targeted Discovery with Cell ID

Unicast Option

Figure 5:
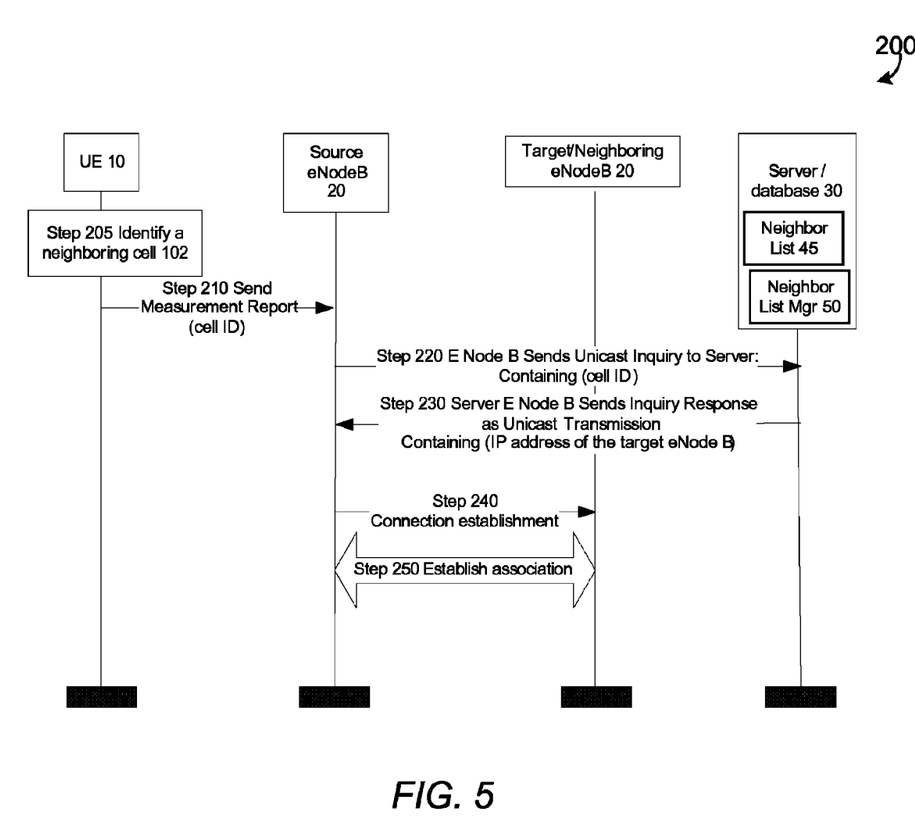
FIG. 5 is a flow diagram for obtaining an IP address of a target node using an unicast inquiry.

Both unicast and multicast transmissions may be used to inquire about information of the target eNode B 20 from other nodes 20 or servers 30. The unicast option can be used when the source eNode B 20 knows a node 20 or server 30 that may have information for the target eNode B 20. One example is a network 40 where the operator deploys servers/databases 30 that have a mapping database containing cell IDs and IP addresses of eNode Bs 20. In one example, this mapping database is referred to as a neighbor list 45. Thus, the source eNodes 20 are capable of evaluating an IP address of a target node 20 from a neighbor list 45 via the E-UTRAN network 40 (neighbor eNode Bs 20, server 30, other entity). This is illustrated in FIG. 5. In FIG. 5, the UE 10 finds a cell ID of a candidate cell 102 that a neighboring eNode B 20 is serving (step 205). In step 210, the measurement report containing the cell ID is sent to the source eNode B 20 (step 210). In step 220, the source eNode B 20 sends a unicast inquiry containing the cell ID to server 30 inquiring what the IP address of the neighboring eNode B 20 is. In step 230, the server/database 30 sends an inquiry response as a unicast transmission back to the source eNode B 20 containing the IP address of the target (or in this case, neighboring) eNode B 20. In step 240, source eNode B 20 sends a connection establishment message to the target or neighboring eNode B 20. In step 250, an association is established between the source eNode B 20 and the target or neighboring eNode B 20.

Multicast Option

The multicast option may be used when the eNode B 20 would like to collect the information from neighbor nodes 20. The eNode B 20 sends an inquiry message containing the cell ID of the target cell 102. Other nodes 20 that received the message respond with required information if they are aware of the eNode B 20 associated with the target cell 102. Here, the other nodes 20 contain a mapping database for cell IDs and IP addresses of eNode Bs 20. If a neighboring node 20 knows the cell ID of the UE 10, the neighboring node 20 may know the IP address of the eNode B 20 serving that cell 102. The eNode B 20 inquiry contains the cell ID and is multicast to neighboring cells 102. The response is sent back by a neighboring node 20 which knows the IP address of the UE 10 as a unicast message to the requesting E Node B 20.

Here, rather than configuring the information about each neighboring eNode B in servers/databases 30 that have a mapping database for cell IDs and IP addresses of eNode Bs 20 serving those cells 102, the radio access network 40 discovery protocols can be used to gather the information from the neighboring transceivers or nodes 20. Nodes 20 may be configured with sufficient information about neighboring eNode Bs 20 (eg., cell IDs and IP addresses) and the IP addresses are gathered from the neighboring node 20 using discovery protocol(s).

Figure 6:
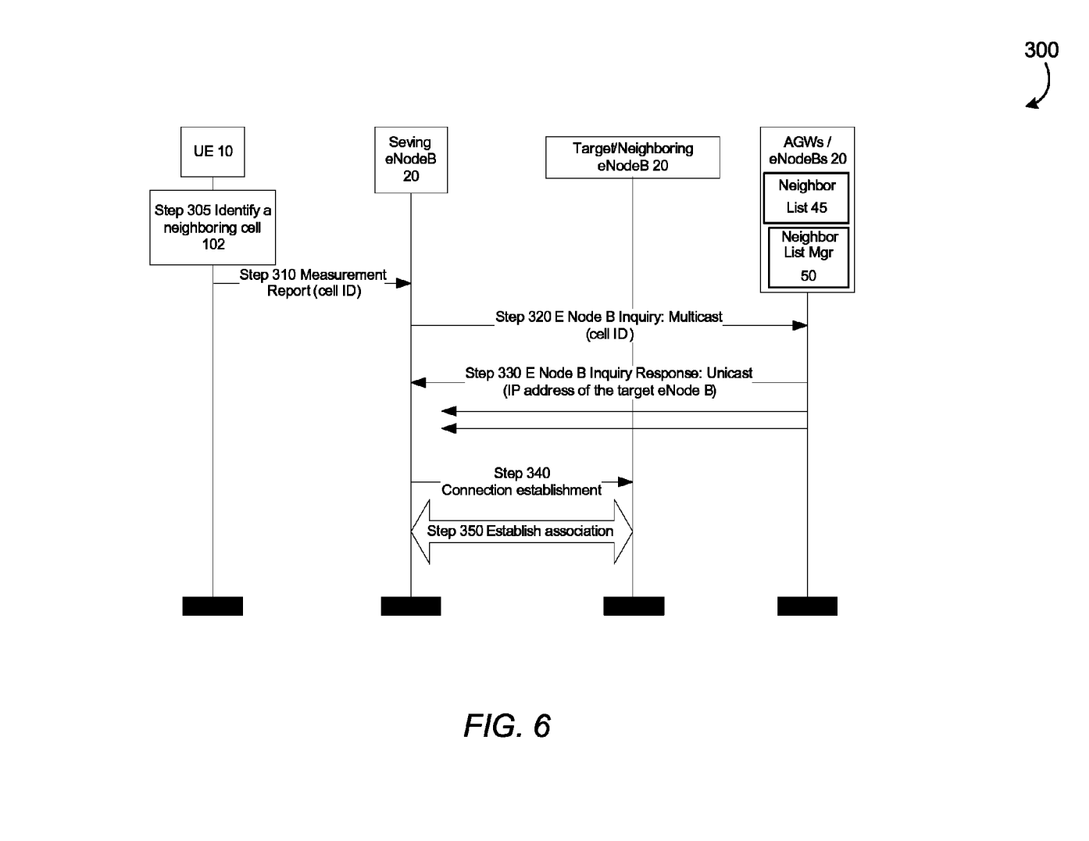
FIG. 6 is a flow diagram for obtaining an IP address of a target node using a multicast inquiry.

This interaction is illustrated in the following call flow shown in FIG. 6. The eNode B2 (20) (target eNode B) is a neighbor of eNode B1 (20) (source eNode B). ENode B3 (20) is provisioned with a Neighbor List 45 that includes the IP address of eNode B2 (20) and the cell ID of the geographic location (or cell 102) served by said eNode B2 (20). The 'Neighbor List Manager' 50 shown in the FIG. 6 is a logical entity that is responsible for gathering information from neighboring eNode Bs 20. Thus, the eNode Bs 20 are capable of evaluating an IP address of a serving node 20 from a neighbor list 45 via neighbor eNode Bs 20."

In FIG. 6, the UE 10 finds a cell ID of a candidate cell 102 that a neighboring eNode B 20 is serving (step 305). In step 310, the measurement report containing the cell ID is sent to a source eNode B 20 (step 310). In step 320, the source eNode B 20 sends a multicast inquiry containing the cell ID to surrounding eNode Bs 20 that are radio base stations or on the access gateway (AGW) inquiring what the IP address of the neighboring eNode B 20 is. In step 330, one of the eNode Bs 20 containing a neighbor list 45 that are radio base stations or on the access gateway (AGW) sends an inquiry response as a unicast transmission back to the source eNode B 20 containing the IP address of the target (or neighboring) eNode B 20. In step 340, source eNode B 20 sends a connection establishment message to neighboring eNode B 20. In step 350, an association is established between the source eNode B 20 and the target (or neighboring) eNode B 20.

Figure 7:
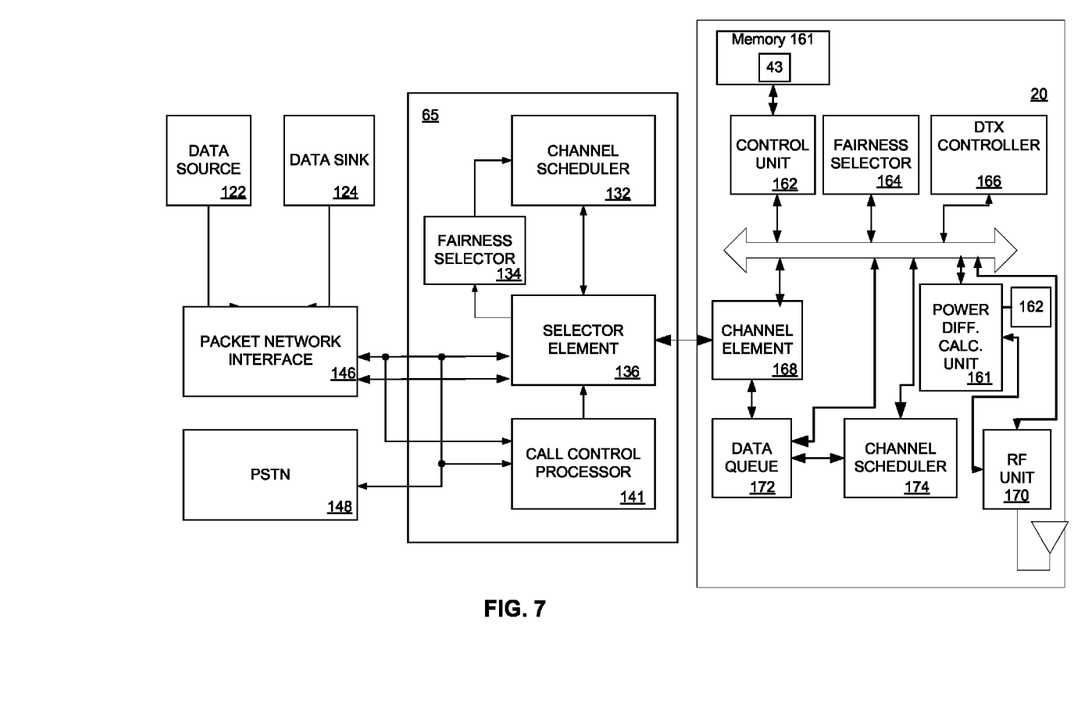
FIG. 7 is a portion of a communication system, including a base station controller and a base station.

FIG. 7 is detailed herein below, wherein specifically, an eNode B 20 and radio network controller 65 interface with a packet network interface 146. Radio network controller 65 includes a channel scheduler 132 for implementing a scheduling algorithm for transmissions in system 100. The channel scheduler 132 determines the length of a service interval during which data is to be transmitted to any particular remote station 10 based upon the remote station's 10 associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data Ri determines the service interval length Li associated with a particular data queue.

In addition, the channel scheduler 132 selects the particular data queue for transmission. The associated quantity of data to be transmitted is then retrieved from a data queue 172 and provided to the channel element 168 for transmission to the remote station 10 associated with the data queue 172. As discussed below, the channel scheduler 132 selects the queue for providing the data, which is transmitted in a following service interval using information including the weight associated with each of the queues. The weight associated with the transmitted queue is then updated.

Radio network controller 65 interfaces with packet network interface 146, Public Switched Telephone Network (PSTN) 148, and all eNode Bs 20 in the communication system 100 (only one eNode B 20 is shown in FIG. 6 for simplicity). Radio network controller 65 coordinates the communication between remote stations 10 in the communication system and other users connected to packet network interface 146 and PSTN 148. PSTN 148 interfaces with users through a standard telephone network (not shown in FIG. 7).

Radio network controller 65 contains many selector elements 136, although only one is shown in FIG. 7 for simplicity. Each selector element 136 is assigned to control communication between one or more base stations 20 and one remote station 10 (not shown). If selector element 136 has not been assigned to a given user equipment 10, call control processor 141 is informed of the need to page the remote station. Call control processor 141 then directs eNode B 20 to page the remote station 10.

Data source 122 contains a quantity of data, which is to be transmitted to a given remote station 10. Data source 122 provides the data to packet network interface 146. Packet network interface 146 receives the data and routes the data to the selector element 136. Selector element 136 then transmits the data to eNode B 20 in communication with the target remote station 10. In the exemplary embodiment, each eNode B 20 maintains a data queue 172, which stores the data to be transmitted to the remote station 10.

The data is transmitted in data packets from data queue 172 to channel element 168. In one example, on the forward link, a "data packet" refers to a quantity of data which is a maximum of 1024 bits and a quantity of data to be transmitted to a destination remote station within a predetermined "time slot" (such as ≈1.667 msec.). For each data packet, channel element 168 inserts the necessary control fields. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link.

At the user equipment 10, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at eNode B 20, specifically the de-interleaving, decoding, and CRC check functions. The decoded data is provided to a data sink.

The DRC signal transmitted by each remote station 10 travels through a reverse link channel and is received at the base station 20 through a receive antenna coupled to RF unit 170. In one example, the DRC information is demodulated in channel element 168 and provided to a channel scheduler 132 located in the radio network controller 65 or to a channel scheduler 174 located in the eNode B 20. In a first exemplary embodiment, the channel scheduler 132 is located in the eNode B 20. In an alternate embodiment, the channel scheduler 132 is located in the radio network controller 65, and connects to all selector elements 136 within the radio network controller 65.

Figure 8:
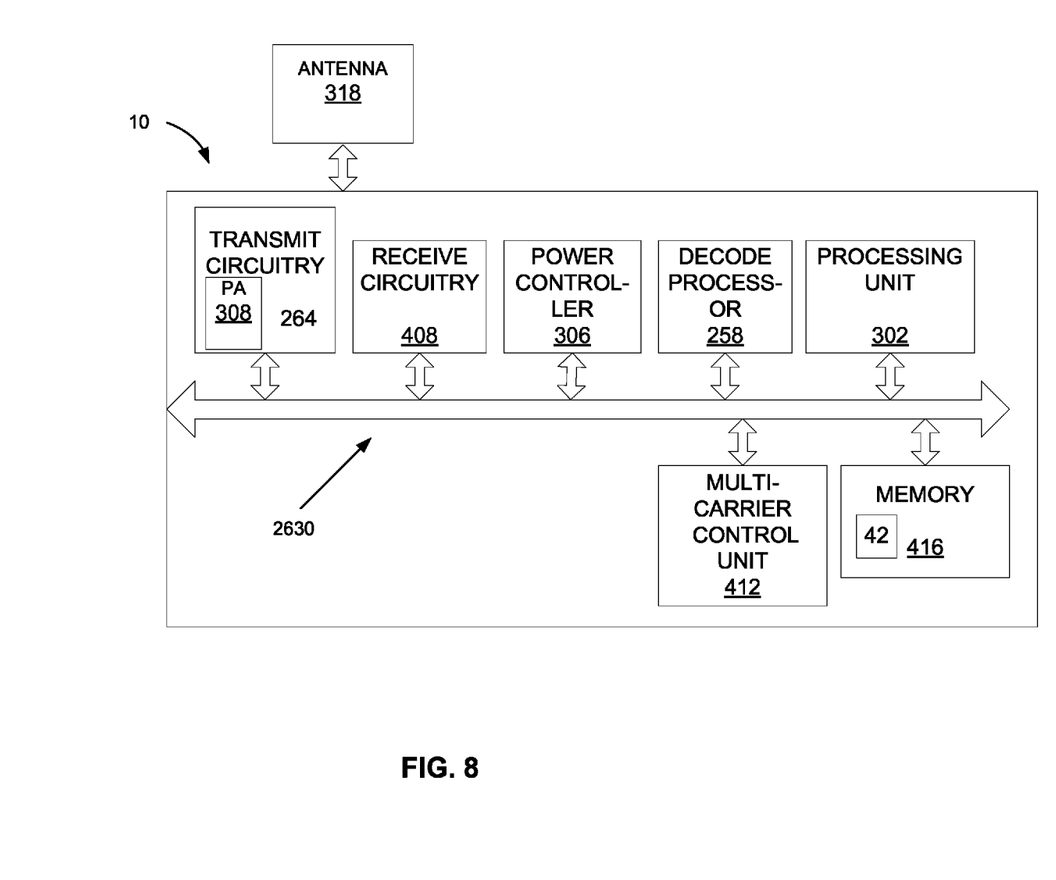
FIG. 8 illustrates an embodiment of user equipment according to the present patent application.

FIG. 8 illustrates an embodiment of a UE 10 according to the present patent application in which the UE 10 includes transmit circuitry 264 (including PA 308), receive circuitry 408, throttle control 306, decode process unit 258, processing unit 302, multi-carrier control unit 412 and memory 416.

The processing unit 302 controls operation of the UE 10. The processing unit 302 may also be referred to as a CPU. Memory 416, which may include both read-only memory (ROM) and random access memory (RAM), provides instructions and data to the processing unit 302. A portion of the memory 416 may also include non-volatile random access memory (NVRAM).

The UE 10, which may be embodied in a wireless communication device such as a cellular telephone, may also include a housing that contains a transmit circuitry 264 and a receive circuitry 408 to allow transmission and reception of data, such as audio communications, between the UE 10 and a remote location. The transmit circuitry 264 and receive circuitry 408 may be coupled to an antenna 318.

The various components of the UE 10 are coupled together by a bus system 2630 which may include a power bus, a control signal bus, and a status signal bus in addition to a data bus. However, for the sake of clarity, the various busses are illustrated in FIG. 8 as the bus system 2630. The AT 106 may also include a processing unit 302 for use in processing signals. Also shown are a power controller 306, a decode processor 258, power amplifier 308 and a multi-carrier control unit 412.

Figure 9:
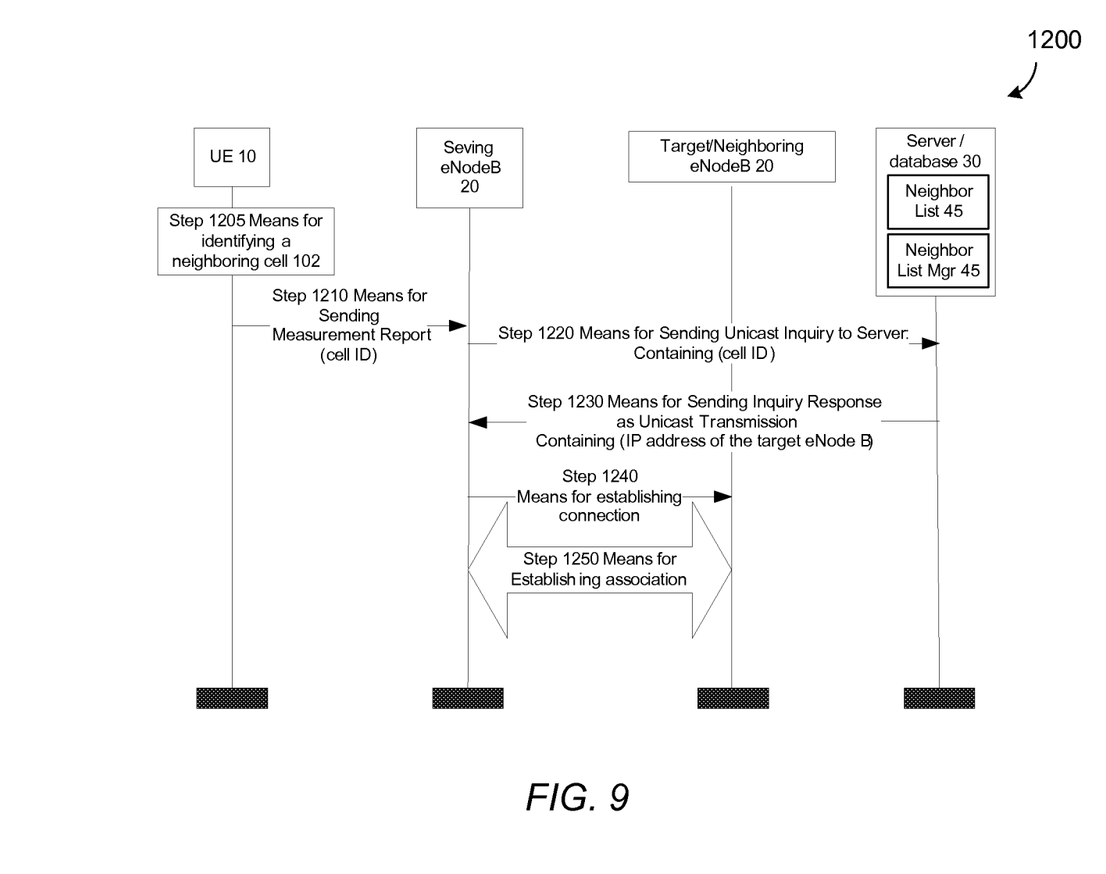
FIG. 9 is a functional block diagram illustrating the steps that are executed when obtaining an IP address of a target node using an unicast inquiry.

The methods and apparatuses of FIG. 5 described above are performed by corresponding means plus function blocks illustrated in FIG. 9. In other words, steps 205, 210, 220, 230, 240 and 250 in FIG. 5 correspond to means plus function blocks 1205, 1210, 1220, 1230, 1240 and 1250 in FIG. 9.

Figure 10:
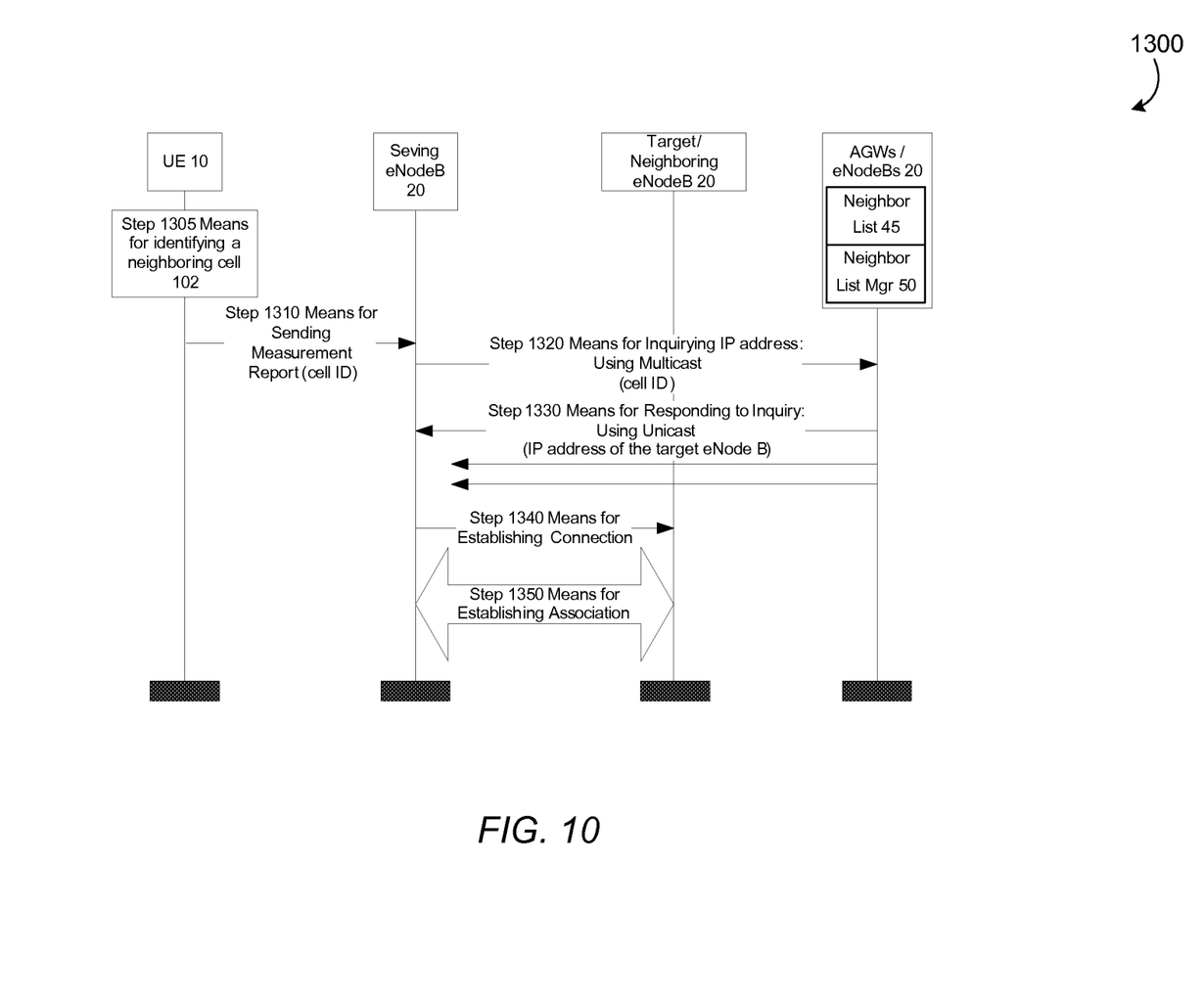
FIG. 10 is a functional block diagram illustrating the steps that are executed when obtaining an IP address of a target node using a multicast inquiry.

The methods and apparatuses of FIG. 6 described above are performed by corresponding means plus function blocks illustrated in FIG. 9. In other words, steps 305, 310, 320, 330, 340, and 350 in FIG. 6 correspond to means plus function blocks 1305, 1310, 1320, 1330, 1340, and 1350 in FIG. 10.

The steps illustrated in FIGS. 5, 6, 9 and 10 may be stored as instructions in the form of software or firmware 42 located in memory 416 in the user equipment 10 shown in FIG. 7. These instructions may be executed by the processing unit circuit 302 of the user equipment 10 shown in FIG. 8. The steps illustrated in FIGS. 5, 6, 9 and 10 may also be stored as instructions in the form of software or firmware 43 located in memory 161 in the eNode B 20. These instructions may be executed by the control unit 162 of the eNode B 20 in FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Therefore, the present invention is not to be limited except in accordance with the following claims.

What is claimed is:

1. A method of identifying an address of a neighboring base station of a neighboring cell, comprising:
    identifying an existence of the neighboring cell;
    receiving a measurement report from a user terminal by a first serving base station that is serving the user terminal, the measurement report containing an identifier of the neighboring cell;
    sending, from the first serving base station, an inquiry as a multicast transmission containing said identifier of the neighboring cell to a plurality of base stations other than the neighboring base station, wherein said inquiry inquires as to an IP address in use by the neighboring base station of said neighboring cell; and
    receiving an inquiry response containing the IP address in use by the neighboring base station from at least one of the plurality of base stations other than the neighboring base station.

2. The method according to claim 1, wherein said plurality of base stations are eNode Bs.

3. The method according to claim 1, wherein said identifier of the neighboring cell is a cell identification (ID).

4. The method according to claim 1, further comprising:
    sending a connection establishment message to the neighboring base station; and
    establishing an association between a source node and the neighboring base station.

5. The method according to claim 1, wherein said inquiry response is received as a unicast transmission.

6. The method according to claim 1, wherein the at least one of the plurality of base stations comprises:
    a neighbor list that includes the IP address and a cell identification (ID) of the neighboring base station; and a neighbor list manager responsible for gathering information from the neighboring base station, wherein said information includes said cell ID and said IP address.

7. The method according to claim 1, wherein the measurement report is generated by the user terminal.

8. The method according to claim 1, wherein the at least one of the plurality of base stations is aware of an association of the neighboring base station with the neighboring cell.

9. The method according to claim 1, wherein the plurality of base stations comprises a plurality of second serving base stations other than the first serving base station and the neighboring base station.

10. The method according to claim 1, wherein the neighboring base station or at least one of the plurality of base stations comprise a node in a different sector of a same cell as the first serving base station or a node within the same cell as the first serving base station.

11. An apparatus for identifying an address of a neighboring base station of a neighboring cell, comprising:
means for identifying an existence of the neighboring cell;
means for receiving a measurement report from a user terminal by a first serving base station that is serving the user terminal, the measurement report containing an identifier of the neighboring cell;
means for sending, from the first serving base station, an inquiry as a multicast transmission containing said identifier of the neighboring cell to a plurality of base stations other than the neighboring base station, wherein said inquiry inquires as to an IP address in use by the neighboring base station of said neighboring cell; and
means for receiving an inquiry response containing the IP address in use by the neighboring base station from at least one of the plurality of base stations other than the neighboring base station.

12. The apparatus according to claim 11, wherein said plurality of base stations are eNode Bs.

13. The apparatus according to claim 11, wherein said identifier of the neighboring cell is a cell identification (ID).

14. The apparatus according to claim 11, further comprising:
means for sending a connection establishment message to the neighboring base station; and
means for establishing an association between a source node and the neighboring base station.

15. The apparatus according to claim 11, wherein said inquiry response is received as a unicast transmission.

16. The apparatus according to claim 11, wherein the at least one of the plurality of base stations comprises:
a neighbor list that includes the IP address and a cell identification (ID) of the neighboring base station; and
a neighbor list manager responsible for gathering information from the neighboring base station, wherein said information includes said cell ID and said IP address.

17. The apparatus according to claim 11, wherein the measurement report is generated by the user terminal.

18. The apparatus according to claim 11, wherein the at least one of the plurality of base stations is aware of an association of the neighboring base station with the neighboring cell.

19. The apparatus according to claim 11, wherein the plurality of base stations comprises a plurality of second serving base stations other than the first serving base station and the neighboring base station.

20. A node capable of identifying an address of a neighboring base station of a neighboring cell, comprising:
a data queue;
a channel element;
an RF unit;
a control unit; and
a memory operably connected to said control unit, wherein said memory comprises instructions to:
identify an existence of the neighboring cell;
receive a measurement report from a user terminal by a first serving base station that is serving the user terminal, the measurement report containing an identifier of the neighboring cell;
send, from the first serving base station, an inquiry as a multicast transmission containing said identifier of the neighboring cell to a plurality of base stations other than the neighboring base station, wherein said inquiry inquires as to an IP address in use by the neighboring base station of said neighboring cell; and
receive an inquiry response containing the IP address in use by the neighboring base station from at least one of the plurality of base stations other than the neighboring base station.

21. The node according to claim 20, wherein said plurality of base stations are eNode Bs.

22. The node according to claim 20, wherein said identifier of the neighboring cell is a cell identification (ID).

23. The node according to claim 20, further comprising instructions to:
send a connection establishment message to the neighboring base station; and
establish an association between a source node and the neighboring base station.

24. The node according to claim 20, wherein said inquiry response is received as a unicast transmission.

25. The node according to claim 20, wherein the at least one of the plurality of base stations comprises:
a neighbor list that includes the IP address and a cell identification (ID) of the neighboring base station; and
a neighbor list manager responsible for gathering information from the neighboring base station, wherein said information includes said cell ID and said IP address.

26. The node according to claim 20, wherein the measurement report is generated by the user terminal.

27. The node according to claim 20, wherein the at least one of the plurality of base stations is aware of an association of the neighboring base station with the neighboring cell.

28. The node according to claim 20, wherein the plurality of base stations comprises a plurality of second serving base stations other than the first serving base station and the neighboring base station.

29. A non-transitory computer-readable medium, storing computer executable code for identifying an address of a neighboring base station of a neighboring cell, comprising:
a first set of codes for causing a computer to identify an existence of the neighboring cell;
a second set of codes for causing the computer to receive a measurement report from a user terminal by a first serving base station that is serving the user terminal, the measurement report containing an identifier of the neighboring cell;
a third set of codes for causing the computer to send, from the first serving base station, an inquiry as a multicast transmission containing said identifier of the neighboring cell to a plurality of base stations other than the neighboring base station, wherein said inquiry inquires as to an IP address in use by the neighboring base station of said neighboring cell; and
a fourth set of codes for causing the computer to receive an inquiry response containing the IP address in use by the neighboring base station from at least one of the plurality of base stations other than the neighboring base station.

30. The non-transitory computer-readable medium according to claim 29, wherein said plurality of base stations are eNode Bs.

31. The non-transitory computer-readable medium according to claim 29, wherein said identifier of the neighboring cell is a cell identification (ID).

32. The non-transitory computer-readable medium according to claim 29, further comprising:
a fifth set of codes for causing the computer to send a connection establishment message to the neighboring base station; and
a sixth set of codes for causing the computer to establish an association between a source node and the neighboring base station.

33. The non-transitory computer-readable medium according to claim 29, wherein said inquiry response is received as a unicast transmission.

34. The non-transitory computer-readable medium according to claim 29, wherein the at least one of the plurality of base stations comprises:
a neighbor list that includes the IP address and a cell identification (ID) of the neighboring base station; and
a neighbor list manager responsible for gathering information from the neighboring base station, wherein said information includes said cell ID and said IP address.

35. The non-transitory computer-readable medium according to claim 29, wherein the measurement report is generated by the user terminal.

36. The non-transitory computer-readable medium according to claim 29, wherein the at least one of the plurality of base stations is aware of an association of the neighboring base station with the neighboring cell.

37. The non-transitory computer-readable medium according to claim 29, wherein the plurality of base stations comprises a plurality of second serving base stations other than the first serving base station and the neighboring base station.

38. At least one processor configured to identify an address of a neighboring base station of a neighboring cell, comprising:
a first hardware module for identifying an existence of the neighboring cell;
a second module for receiving a measurement report from a user terminal by a first serving base station that is serving the user terminal, the measurement report containing an identifier of the neighboring cell;
a third module for sending, from the first serving base station, an inquiry as a multicast transmission containing said identifier of the neighboring cell to a plurality of base stations other than the neighboring base station, wherein said inquiry inquires as to an IP address in use by the neighboring base station of said neighboring cell; and
a fourth module for receiving an inquiry response containing the IP address of the neighboring base station from at least one of the plurality of base stations other than the neighboring base station.

\* \* \* \* \*